United States Patent [19]
Takino et al.

[11] Patent Number: 5,921,374
[45] Date of Patent: Jul. 13, 1999

[54] SORTING AND DISCHARGING DEVICE WITH SPHERICAL SORTING ROLLERS

[75] Inventors: Shigekatsu Takino; Shinichi Hayashida, both of Saitama, Japan

[73] Assignee: Tsubakimoto Chain Co., Osaka, Japan

[21] Appl. No.: 08/812,083

[22] Filed: Mar. 6, 1997

[30] Foreign Application Priority Data

Mar. 8, 1996 [JP] Japan ..................................... 8-051927

[51] Int. Cl.⁶ .................................................. B65G 47/00
[52] U.S. Cl. .................................. 198/369.4; 193/35 MD
[58] Field of Search .................... 198/369.4; 193/35 MD

[56] References Cited

U.S. PATENT DOCUMENTS

| | | | |
|---|---|---|---|
| 4,372,435 | 2/1983 | Bradbury | 198/396.4 |
| 4,913,277 | 4/1990 | Zorgiebel et al. | 198/369.4 |
| 5,012,914 | 5/1991 | Berends et al. | 198/369.4 |
| 5,160,017 | 11/1992 | Goodman et al. | 193/35 MD |
| 5,261,526 | 11/1993 | Rombouts | 193/35 MD |

FOREIGN PATENT DOCUMENTS 7-41700   9/1995   Japan.
8-11773   1/1996   Japan.

*Primary Examiner*—Joseph E. Valenza
*Assistant Examiner*—Khoi H. Tran
*Attorney, Agent, or Firm*—Armstrong, Westerman, Hattori, McLeland and Naughton

[57] ABSTRACT

Spherical sorting rollers are arranged in rows transversely of an article conveyance path, and line shafts, which are connected to a drive source and are rotated thereby, are disposed sideways in parallel with the rows of the sorting rollers. The spherical outer peripheral surfaces of the spherical sorting rollers and the line shafts are brought into abutment with each other to drive the sorting rollers simultaneously. The spherical sorting rollers are each supported individually by a roller supporting frame. The roller supporting frame can turn at a predetermined position about a vertical axis which passes through the center of each roller. The roller supporting frames are turned in a sorting direction simultaneously by a swing mechanism, whereby an article which has been conveyed up to a sorting position is sent out sideways from above the article conveyance path. The sorting and discharging device provided is capable of effecting a sorting operation efficiently with little wear of sorting rollers and little power loss.

4 Claims, 8 Drawing Sheets

SORTING AND DISCHARGING DEVICE WITH SPHERICAL SORTING ROLLERS

FIELD OF THE INVENTION

The present invention relates to a sorting and discharging device to be used for sorting articles such as, for example, newspaper bundles or packaged articles during conveyance thereof.

BACKGROUND OF THE INVENTION

Heretofore, a conventional sorting system for sorting articles being conveyed on one conveyor onto another conveyor, chute, or similar, disposed in a crossing relation to the one conveyor has been disclosed in Japanese Utility Model Publication No. 41700/95. In this known sorting system, a plurality of direction changing wheels, which are arranged transversely of an article sorting conveyor and which are capable of turning right and left, project from the conveyance surface of the conveyor so as to face in a specific direction, thereby sorting each article passing over the direction changing wheels so as to advance in the specific direction.

In the sorting system disclosed in the above Japanese utility model publication 41700/95 a mechanism is used which, at the time of sorting articles, causes the plurality of direction changing wheels, arranged transversely of the conveyor, to move simultaneously upward from the conveyance surface of the conveyor and at the same time causes the wheels to turn. Further, using a flexible round belt, a rotating force is transmitted to each such vertically movable direction changing wheel. Consequently, the problem arises that the structure is complicated.

Besides, the round belt becomes slack in an early stage of the sorting operation due to the repeated ascending and descending motions of each direction changing wheel, so that variations occur in the driving force among the direction changing wheels, which variations may obstruct the sorting operation. In addition, since the direction changing wheels are arranged only in one row transversely of the conveyor, the problem arise that the motion of each article becomes unstable during sorting.

To solve the above-mentioned problems, the sorting and discharging device of the present invention includes a plurality of sorting rollers corresponding to the direction changing wheels are arranged in both a conveyance direction and a transverse direction of an article conveyance path. The sorting rollers are respectively supported by roller supporting frames which are capable of turning about a vertical axis and which charge the direction of the sorting rollers simultaneously. The lower portions of the outer peripheral surfaces of the sorting rollers are arranged in each row so as to be in the transverse direction of the article conveyance path and are brought into abutment with a line shaft which is driven rotatively by a drive source and are thereby simultaneously rotated frictionally.

The sorting and discharging device is simple in structure and can perform the sorting operation quickly and positively. However, since the driving force of the line shaft is transmitted to the sorting rollers while the rotational axis of the sorting rollers and the rotational axis of the line shaft are inclined with respect to each other during sorting, slipping occurs between the sorting rollers and the line shaft, with an excessive load being exerted between the two. Thus, the sorting rollers develop wear and it is necessary to use a motor of a large driving force as the drive source.

Accordingly, it is an object of the present invention to solve the above-mentioned problems of the prior art and provide a sorting and discharging device with reduced wear of the sorting rollers and little power loss and capable of performing an efficient sorting operation.

SUMMARY OF THE INVENTION

According to the present invention, in order to achieve the above-mentioned object, a sorting and discharging device is provided which includes a plurality of spherical sorting rollers arranged in both a conveyance direction and a transverse direction of an article conveyance path; a plurality of roller supporting frames for supporting the spherical sorting rollers respectively so that each roller can rotate about a horizontal axis, the roller supporting frames each being rotatable at a predetermined position about a vertical axis passing through the center of the associated spherical sorting roller; a swing mechanism for simultaneously turning each of the plural roller supporting frames about the vertical axis in such a manner that the spherical sorting rollers face in the same direction; a plurality of line shafts are disposed respectively sideways in parallel with rows of the spherical sorting rollers arranged in the transverse direction of the article conveyance path, the shafts coming into abutment respectively with the spherical outer peripheral surfaces of the spherical sorting rollers; and a drive source for rotating the plural line shafts simultaneously in a synchronized manner.

In the sorting and discharging device according to the present invention, it is preferable that a plurality of spherical sorting roller groups be arranged in series in the conveyance direction of the article conveyance path, the spherical sorting roller groups being respectively turned independently by a plurality of swing mechanisms each capable of being operated independently.

Further, it is preferable that clearances, formed between adjacent spherical sorting rollers, be covered with a cover having circular roller projecting holes. The roller projecting holes are formed in positions corresponding respectively to the spherical sorting rollers, and the spherical sorting rollers project only partially from the roller projecting holes.

In operation, when an article to be sorted is conveyed from the upstream side of the article conveyance path up to a position close to the spherical sorting rollers, the roller supporting frames, which support the spherical sorting rollers, respectively, are turned in the sorting direction by the foregoing swing mechanism. At this time, the spherical sorting rollers are in frictional contact with the line shafts disposed sideways and are thereby rotated. As the article further advances onto the spherical sorting rollers facing in the sorting direction, the advancing path of the article is turned in the sorting direction, whereby the article is fed to a predetermined sorting position from above the conveyance path.

When the spherical sorting rollers turn in the sorting direction, the distance between each roller-line shaft contact point and the roller supporting shaft axis decreases, so that the rotation of the rollers is increased, whereby a decrease of the velocity component in the article conveyance path direction contained in the article moving velocity is offset. That is, the velocity component in the article conveyance path direction does not change before and after the change of the article advancing path. Therefore, the spacing on the conveyance path between the article being sorted and the article which follows is maintained constant.

DETAILED DESCRIPTION OF THE INVENTION

Figure 1:
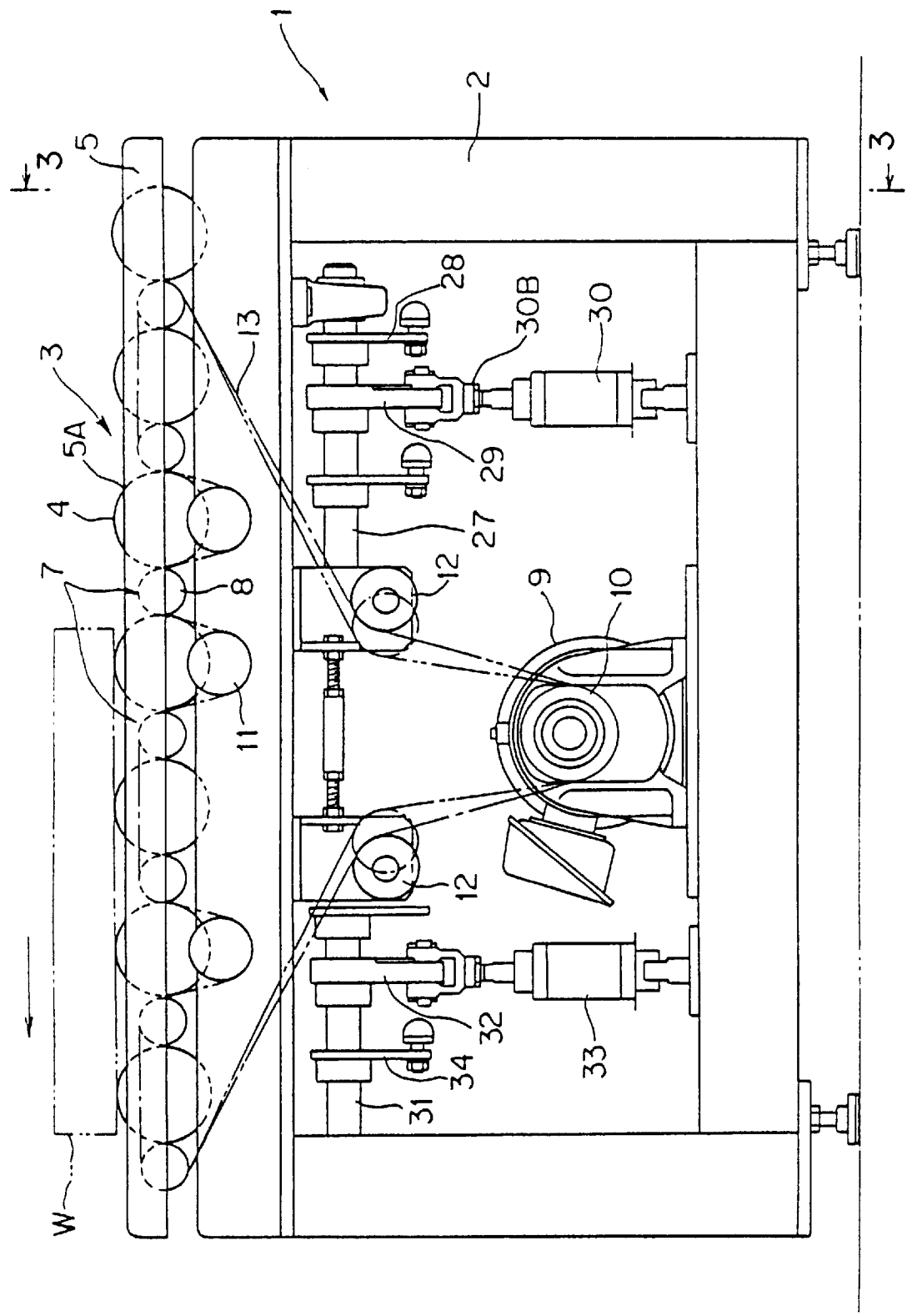
FIG. 1 is a side view of a sorting and discharging device according to a first embodiment of the present invention.
Figure 2:
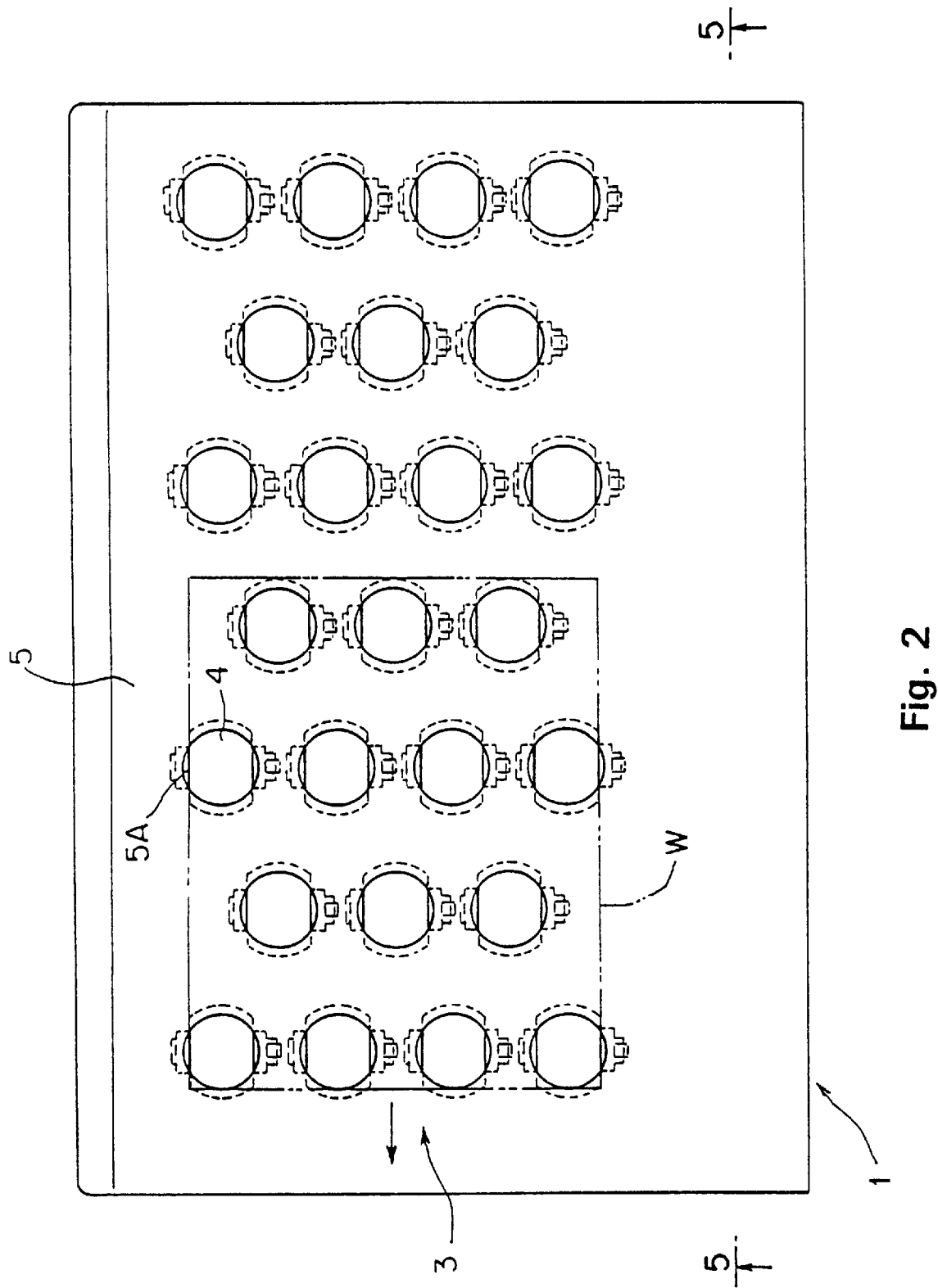
FIG. 2 is a plan view of a sorting and discharging device according to the first embodiment of the present invention.

Embodiments of the present invention will now be described with reference to the accompanying drawings. FIG. 1 is a side view of a sorting and discharging device according to a first embodiment of the present invention, and FIG. 2 is a plan view thereof. In the sorting and discharging device indicated at 1, an article conveyance path 3, for conveying an article W to be sorted, is formed on a frame 2. A large number of spherical sorting rollers 4 on the conveyance surface of the article conveyance path 3 in both a conveyance direction and a transverse direction.

Clearances between adjacent sorting rollers 4 are covered with a cover 5 mounted to the upper portion of the frame 2. A large number of circular roller projecting holes 5A are formed in the cover 5 at positions corresponding to the rollers 4, and the rollers 4 project upwardly out of the roller projecting holes 5A only partially to bear the article W. In order that the bottom of the article W may be supported uniformly by the rollers, a row of four spherical sorting rollers 4 and a row of three same rollers, both arranged transversely of the article conveyance path 3, are disposed alternately in the conveyance direction of the article conveyance path 3.

Figure 3:
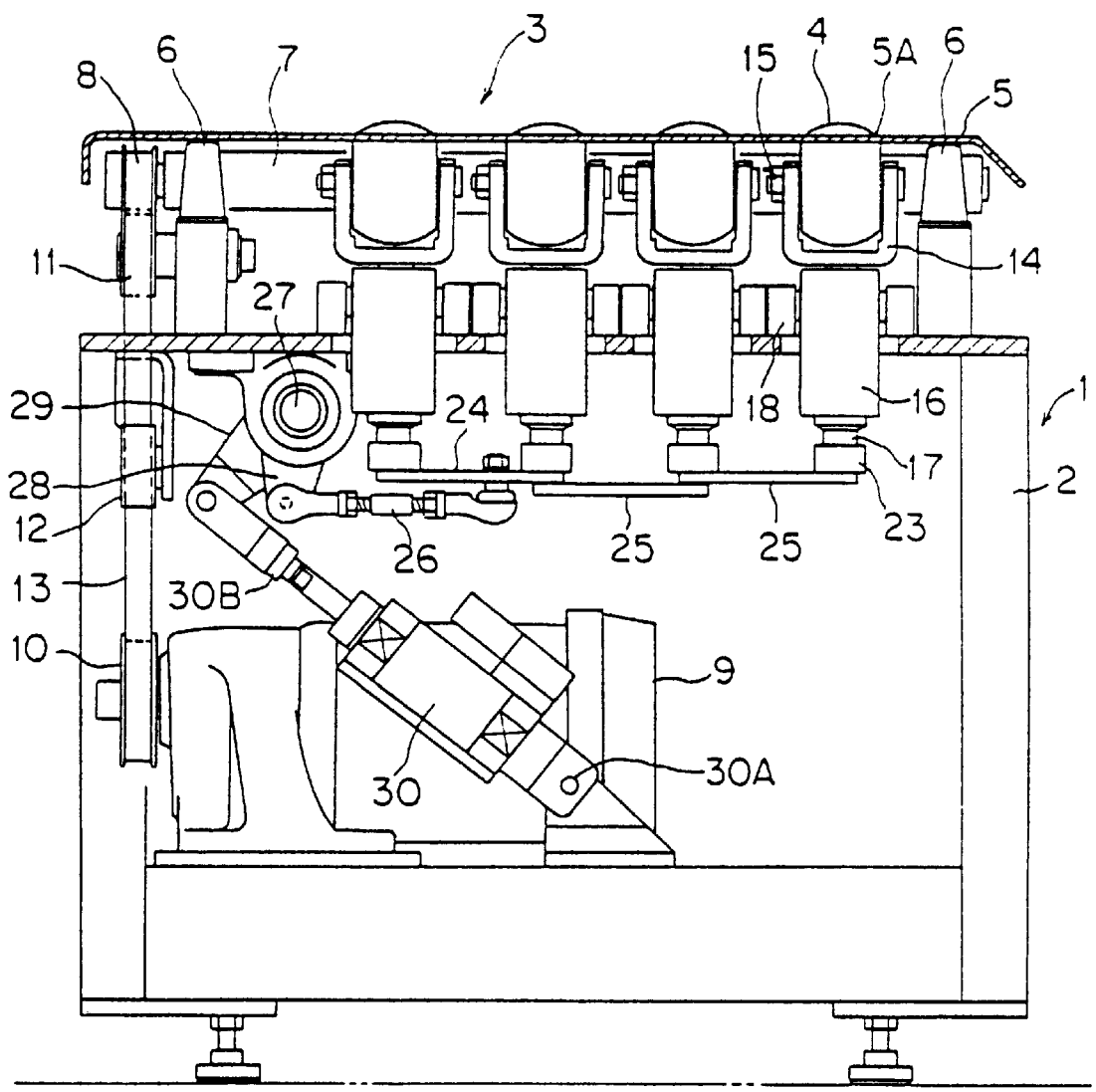
FIG. 3 is a sectional view as seen in the arrowed direction A—A in FIG. 1.

FIG. 3 is a sectional view of the sorting and discharging device 1 as seen in the arrowed direction A—A in FIG. 1. As shown in the same figure, the spherical sorting rollers 4, arranged in the transverse direction of the article conveyance path 3, are frictionally driven simultaneously by line shafts 7 which are supported rotatably by bearings 6 on both transverse sides of the frame 2.

As shown in FIG. 1, the line shafts 7 are arranged on the frame 2 at predetermined intervals in the conveyance direction. A driven pulley 8 is mounted on one end portion of each line shaft 7, while a driving pulley 10, of a motor 9 as a drive source, is disposed at the lower portion of the frame 2. A belt 13 is stretched between the driven pulleys 8 and the driving pulley 10. The belt 13 is in engagement with both pulleys and through idle pulleys 11 and tension pulleys 12. All the line shafts 7 are driven simultaneously in the same direction by the motor 9. As shown in FIG. 1, the tension pulleys 12 are mounted to the frame 2 so that their position is adjustable. The tension of the belt 13 can be adjusted by changing the spacing between both of the tension pulleys 12 which are opposed to each other.

Figure 4:
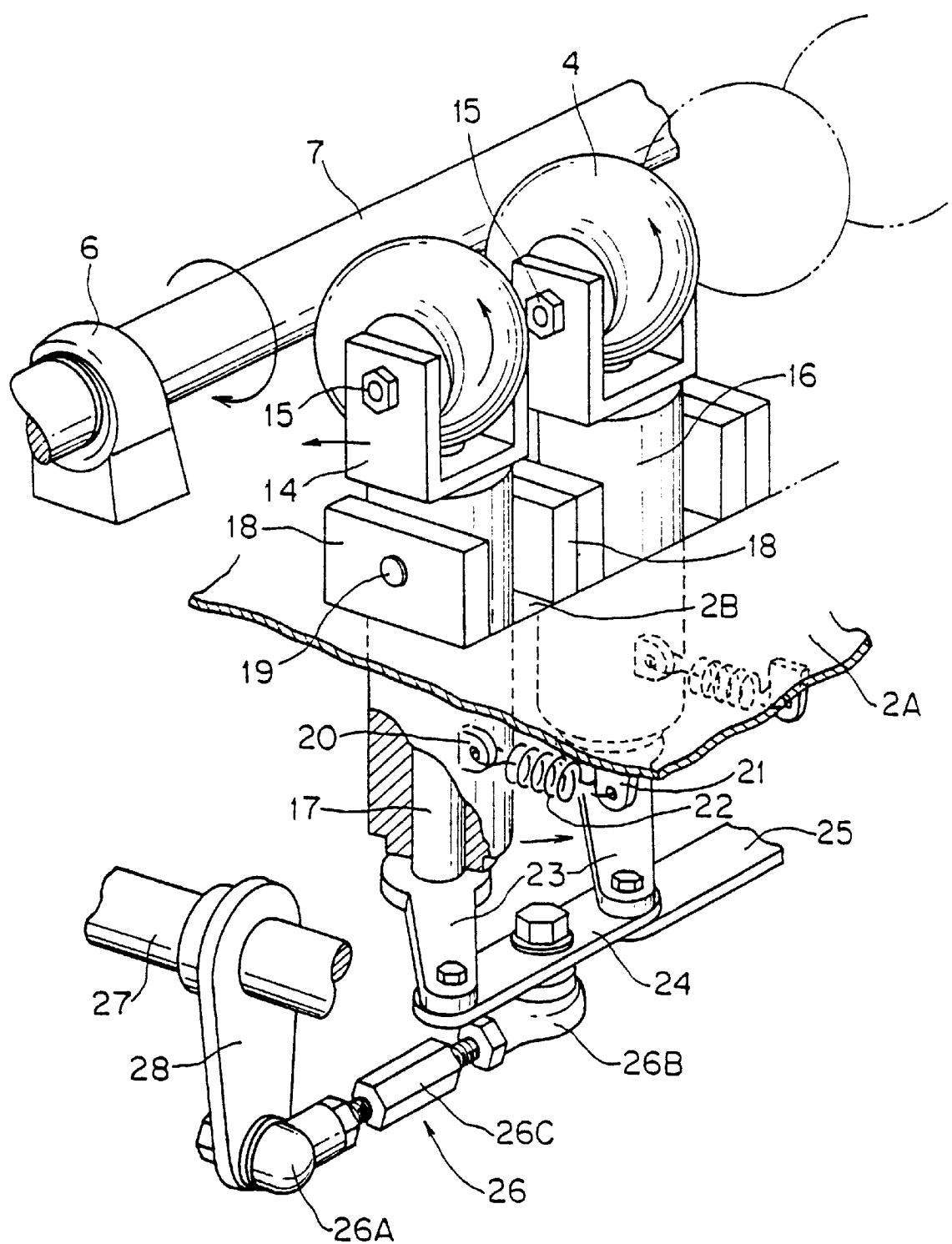
FIG. 4 is a perspective view showing a principal portion of the sorting and discharging device.

As shown in FIGS. 3 and 4, each spherical sorting roller 4 is attached to a roller supporting frame 14 so as to be rotatable about a horizontal axis through a roller supporting shaft 15. The roller supporting frame 14 is fixed to the upper end of a roller swing shaft 17. The roller swing shaft 17 is supported by a bearing cylinder 16 on the frame 2 side so that it can turn about a vertical axis. The spherical sorting roller 4 is supported by the roller supporting frame 14 at a position in which the axis of the roller swing shaft 17 passes through the center of the roller.

The bearing cylinder 16 is disposed vertically through a through hole 2B formed in a horizontal member 2A of the frame 2. The bearing cylinder 16 is held pivotably in a vertical plane in the longitudinal direction of the frame 2, namely, in the conveyance direction of the conveyance path 3, through a pivot shaft 19 which is supported by two bearing pieces 18 erected on both side edge portions of the through hole 2B. Further, a spring mounting piece 20 is formed projectingly on a side face of the portion of the bearing cylinder 16 which projects downward from the horizontal member 2A. On the underside of the horizontal member 2A, a spring mounting piece 21 is formed in an opposed relation to the spring mounting piece 20, and a tension coil spring 22 is stretched between the spring mounting pieces 20 and 21. The bearing cylinder 16 is urged by the coil spring 22 so that the outer peripheral surface of the spherical sorting roller 4 is pushed at all times against the outer peripheral surface of the line shaft 7 disposed sideways of the roller.

A swing lever 23 is fixed to the portion of the roller swing shaft 17 projecting downwardly from the lower end of the bearing cylinder 16. The swing lever 23 is provided in corresponding relation to each of the spherical sorting rollers 4 arranged in the transverse direction of the frame 2, and swing ends of the swing levers 23 are connected together pivotably by interlocking links 24 and 25 so that all the swing levers 23 are turned in the same direction.

To an intermediate part of each interlocking link 24, out of the interlocking links 24 and 25, is pivotably connected one end of a connecting rod 26 whose length is adjustable. To the opposite end of the connecting rod 26 is pivotably connected a swing end of a link arm 28 which is fixed to a link arm 28. The link shaft 27 is pivotably supported between a pair of bearings which are spacedly mounted from each other in the longitudinal direction of the frame 2.

The connecting rod 26 includes connecting portions 26A and 26B at both ends thereof and a central adjusting portion 26C, which are threadedly coupled together. The distance between both connecting portions 26A and 26B is changed by rotating the adjusting portion 26C, whereby the direction of the spherical sorting rollers 4 can be adjusted.

As shown in FIGS. 1 and 3, a driving arm 29 is fixed to the link shaft 27, and a swing end of the driving arm 29 is pivotally connected to an upper end side of an actuating rod 30B of an air cylinder 30 whose lower end side is pivotably supported by the bottom of the frame 2 through a mounting shaft 30A. With protrusion or retraction of the actuating rod 30B, the link shaft 27 swings, and the spherical sorting rollers 4 turn simultaneously through link arm 28, connecting rod 26, interlocking links 24, 25 and swing lever 23. By a series of components from the air cylinder 30 up to the swing levers 23, a swing mechanism is constituted for the roller supporting frames 14.

Figure 5:
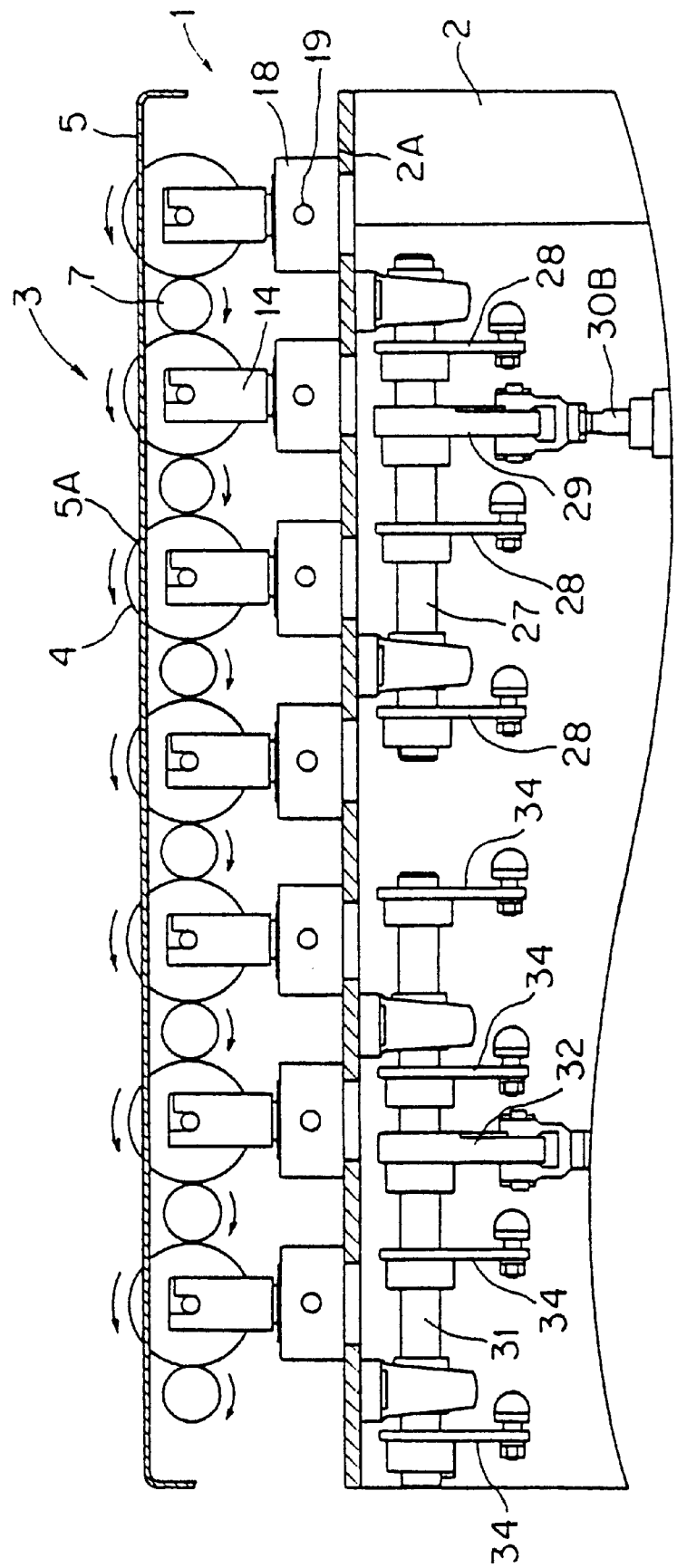
FIG. 5 is a sectional view as seen in the arrowed direction B—B in FIG. 2.

FIG. 5 is a sectional view as seen in the arrowed direction B—B in FIG. 2. As shown in the same figure, the link arm 28 is fixed at three positions to the link shaft 27 corresponding to three rows of spherical sorting rollers 4 located upstream in the conveyance direction (out of four rows of the rollers arranged transversely of the frame 2). By operating the air cylinder 30, the direction of the sorting rollers 4, connected row by row to the link arms 28, is changed simultaneously.

Inside the frame 2 and behind the link shaft 27, a link shaft 31 of the same structure as the link shaft 27 is disposed. The link shaft 31 is supported pivotably between a pair of bearings which are spacedly mounted in the longitudinal direction of the frame 2. The link shaft 31 is disposed coaxially with the link shaft 27, and a driving arm 32, of the same structure as the driving arm 29, is fixed to the link shaft 31. As shown in FIG. 1, as is the case with the air cylinder 30, a swing end of the driving arm 32 is connected to an upper end side of an actuating rod of an air cylinder 33 whose lower end side is mounted to the bottom of the frame 2.

As shown in FIG. 5, link arms 34, of the same structure as the link arms 28, are fixed at four positions to the link shaft 31 to change the direction of four rows of spherical sorting rollers 4 located downstream in the conveyance direction (out of the rows of the rollers 4 arranged transversely of the frame 2). The direction of the four downstream rows of the rollers 4 are simultaneously changed by operating the air cylinder 33. By a series of these components, another swing mechanism is constituted which can be operated independently of the foregoing swing mechanism for the roller supporting frames.

The operation of the sorting and discharging device 1, constructed as above, will now be described with reference to FIG. 6. The article conveyance path 3, of the sorting and discharging device, is constituted as part of an article conveyance path which is constituted by a conveyor such as, for example, a roller conveyor or a belt conveyor (neither shown). Sideways of the sorting and discharging device 1 is disposed, for example, a chute or a roller conveyor (neither shown) for receiving the sorted article from the sorting and discharging device 1.

Figure 6A:
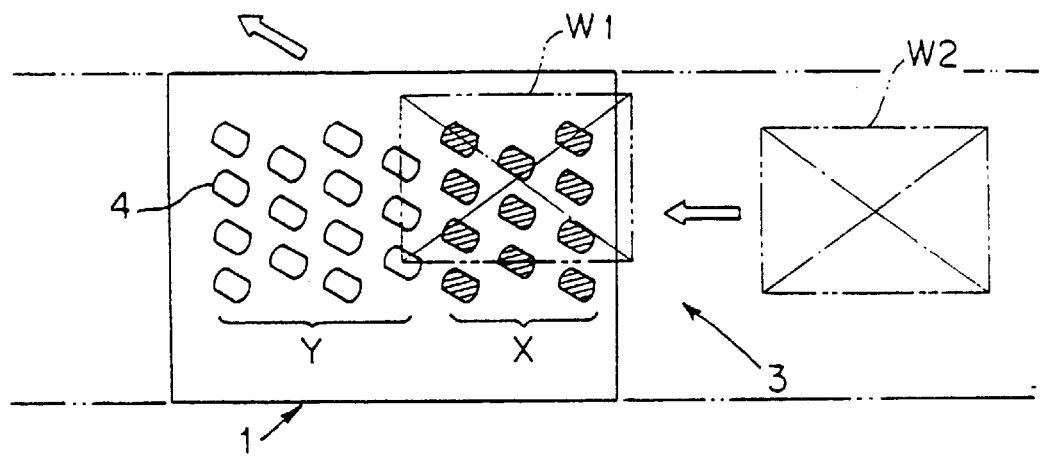
FIG. 6 is an explanatory diagram showing sorting motions of spherical sorting rollers used in the sorting and discharging device.

FIG. 6(a) shows a state in which two articles W1 and W2 have been conveyed on the article conveyance path 3 up to the position of the sorting and discharging device 1. It is here assumed that sorting directions are predetermined by the sorting and discharging device 1 so as to sort the preceding article W1 sideways to the right-hand side and permit the succeeding article W2 to advance as it is to the downstream side of the article conveyance path 3.

Before the preceding article W1 reaches the sorting and discharging device 1, all the spherical sorting rollers 4 of the sorting and discharging device 1, namely, three upstream rows X and four downstream rows Y, of the sorting rollers 4, arranged transversely of the article conveyance path 3, so that their direction is charged to the sorting direction by operating air cylinders 30 and 33 shown in FIG. 1. Then, when the preceding article W1 moves onto the sorting rollers 4, the advancing direction of the article W1 is changed to an obliquely right and forward direction with respect to the conveyance path 3.

Figure 6B:
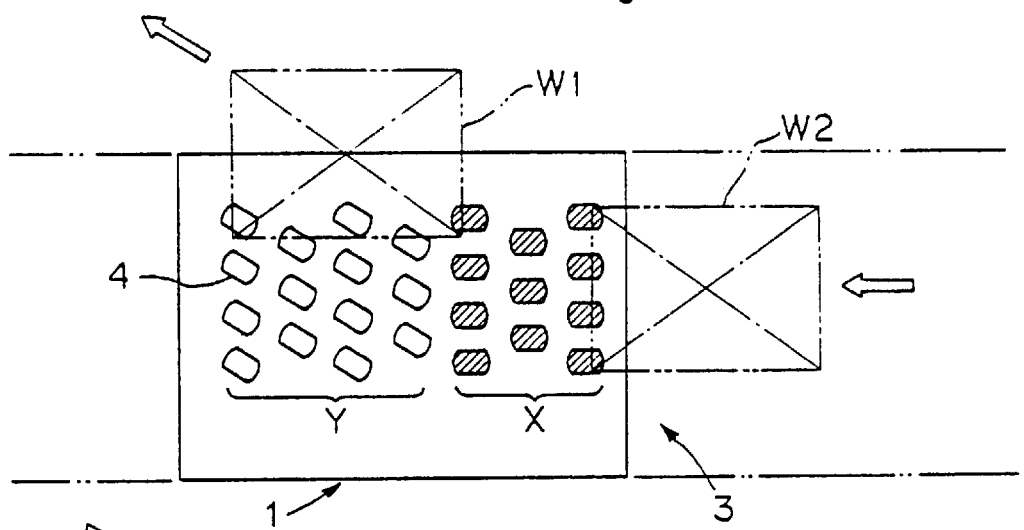

Then, as shown in FIG. 6(b), before the succeeding article W2, which is to go straight on the article conveyance path 3, reaches the upstream end of the sorting and discharging device 1, the direction of the three upstream rows of sorting rollers 4 is returned to the original direction by reverse operation of the air cylinder 30 shown in FIG. 1.

Figure 6C:
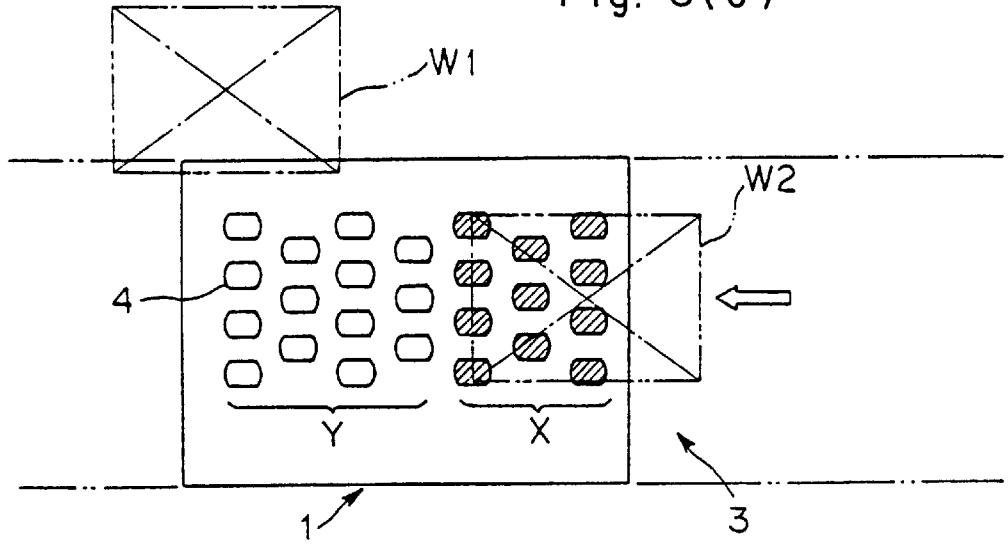

At this time, the four down stream rows Y of the sorting rollers 4 still face in the sorting direction, so that the preceding article W1 is sure to be sent out from above the article conveyance path 3 by the four downstream rows of sorting rollers 4. When the sorting operation for the preceding article 1 is over, the air cylinder 33 shown in FIG. 1 performs its reverse motion immediately, whereby the direction of the four downstream rows Y of sorting rollers 4 is returned to the original straight forward direction, as shown in FIG. 6(c), so that the succeeding article W2, which has advanced onto the three upstream rows X of sorting rollers 4, is delivered as it is to the four downstream rows Y of sorting rollers 4 and is thereby conveyed to the downstream side of the conveyance path 3.

Figure 7:
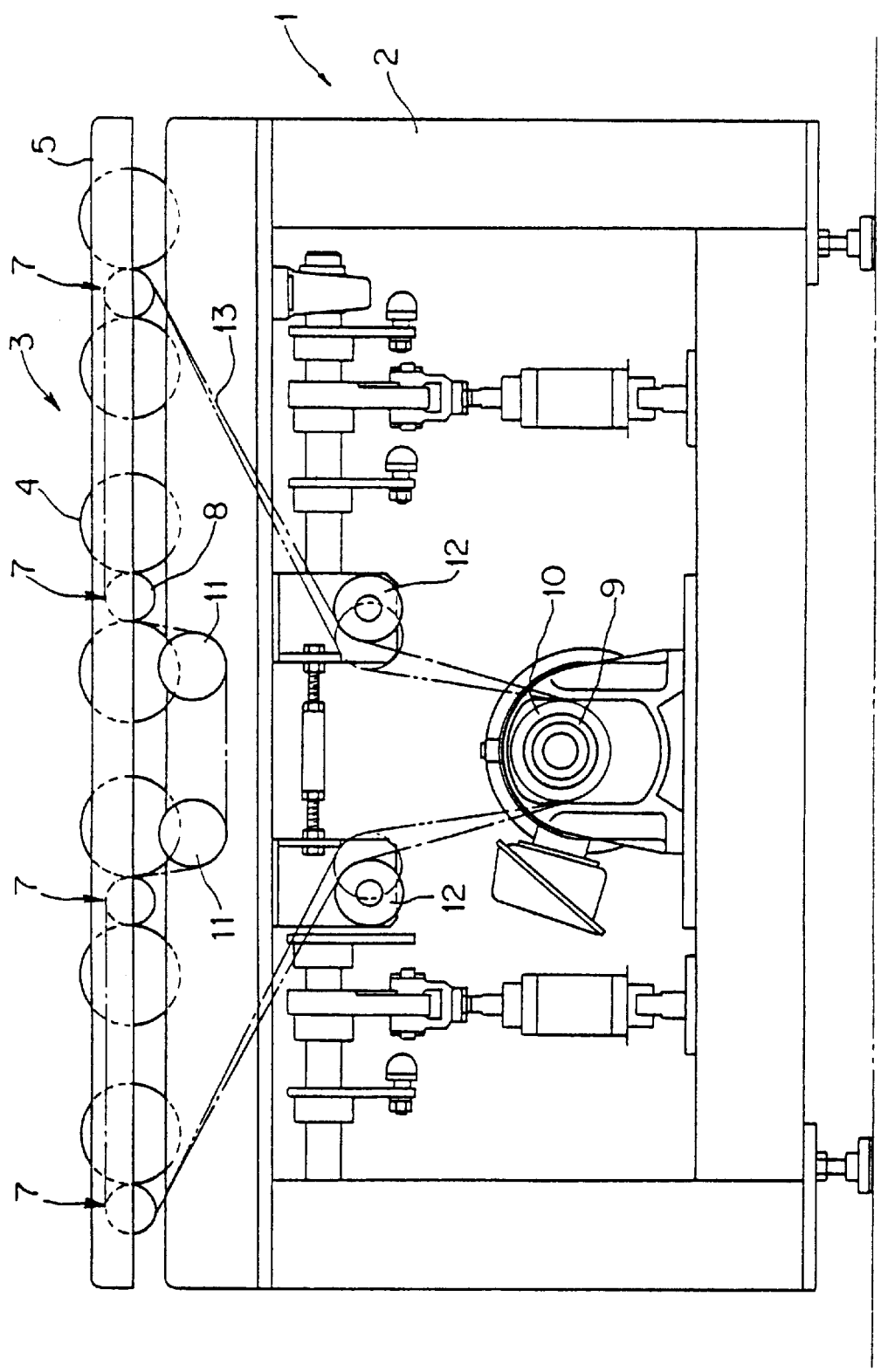
FIG. 7 is a side view of a sorting and discharging device according to a second embodiment of the present invention.
Figure 8:
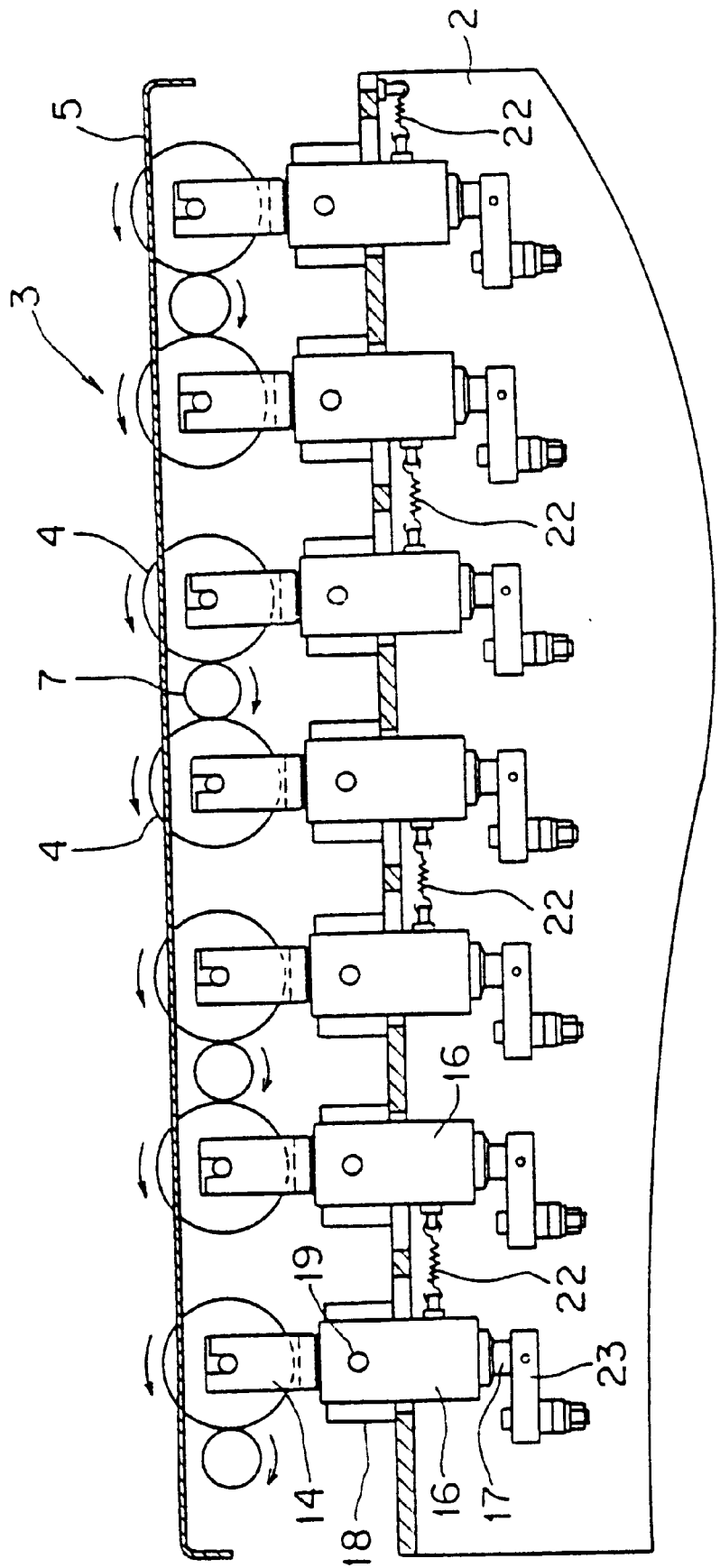
FIG. 8 is an explanatory diagram showing in what state spherical sorting rollers and line shafts, both used in the sorting and discharging device of the second embodiment, are in contact with each other.

FIG. 7 is a side view showing a sorting and discharging device according to a second embodiment of the present invention, and FIG. 8 is a diagram showing in what state line shafts and spherical sorting rollers contact each other in this embodiment. The sorting and discharging device of this embodiment is constructed so that spherical sorting rollers are brought into pressure contact with a single line shaft from both sides of the shaft and are rotated thereby. The number of line shafts used is reduced in comparison with the first embodiment described above.

More specifically, as shown in FIG. 7, line shafts 7 are disposed longitudinally at four positions on a frame 2 of the sorting and discharging device which is indicated by the reference numeral 1. A belt 13 is stretched between and in engagement with driven pulleys 8 fixed to the line shafts 7 and a driving pulley 10 of a motor 9, while passing two idle pulleys 11 and two tension pulleys 12. All the line shafts 7 are driven simultaneously by the motor 9 through the belt 13.

In this embodiment, as shown in FIG. 8, tension springs 22 for urging spherical sorting rollers 4 against the line shafts 7 are each stretched between adjacent bearing cylinders 16 which are opposed to each other in the longitudinal direction of the frame 2. The number of the tension springs 22 is smaller than in the previous first embodiment. In FIGS. 7 and 8, the components indicated by the same reference numerals as in the first embodiment are of the same structures as in the first embodiment.

Although in the above embodiments, the direction of the three upstream rows and four downstream rows (out of the rows of spherical sorting rollers 4 arranged transversely of the article conveyance path) 3, can be changed independently by the two air cylinders 30 and 33. A construction may be adopted in which all the sorting rollers 4 are changed in direction by using a single air cylinder. The diameter and number of spherical sorting rollers 4 in each transverse row, as well as the number of such row, can be determined as necessary according to, for example, the size and weight of articles to be sorted.

Also, as to the mechanism for turning the direction of the roller supporting frames which support the spherical sorting rollers, it is not limited to the structure described in each of the above embodiments. Any other structure may be adopted insofar as it can turn the sorting rollers simultaneously in the same direction.

Although in each of the above embodiments, the bearing cylinders, which hold the roller supporting frames, are each supported swingably on the frame side, with a swing shaft as fulcrum. A tension spring is connected to the bearing cylinder to push the sorting rollers against each line shaft, thereby allowing the rollers to be driven frictionally by the line shaft. The tension springs may be substituted with compression springs, or a weight or similar may be attached to each bearing cylinder to shift the central position of the bearing cylinder and thereby induce, a moment, around the swing shaft, acting in a direction to push the sorting roller against the line shaft. Further, there may be made a modification such that each bearing cylinder is fixed to the frame side, while the line shaft is held in bearings which support the line shaft on the frame side so as to be movable toward and away from each of the spherical sorting rollers arranged transversely of the frame. The bearings are urged toward the sorting roller side by means of springs or similar to urge the line shaft against the rollers.

Although in each of the above embodiments, the outer peripheral surfaces of the spherical sorting rollers directly contact the outer peripheral surface of the associated line shaft to transfer the rotating force of the line shaft to the rollers, rings of an elastic material having a large frictional coefficient such as rubber may be fitted on the outer peripheral surface of the line shaft at only the positions opposed to the sorting rollers, so that the outer peripheral surfaces of the rings come into abutment with the sorting rollers.

According to the sorting and discharging device of the present invention, as set forth hereinabove, line shafts are disposed sideways in parallel with rows of spherical sorting rollers arranged in the transverse direction of the article conveyance path and are brought into abutment with the spherical outer peripheral surfaces of the spherical sorting rollers to rotate the rollers simultaneously. Therefore, no matter in which direction the sorting rollers may face, the transfer of rotation from the line shafts to the rollers can be done without causing slipping at the contact points between the line shaft and the rollers. Consequently, it is possible to prevent both wear of the sorting rollers and power loss which are attributable to the slipping, thus permitting the use of a motor with a small driving force.

When the spherical sorting rollers turn in the sorting direction during sorting of articles, the distance between each roller-line shaft contact point and the roller supporting shaft axis decreases, so that the rotation of the rollers is increased, whereby a decrease of the velocity component in the article conveyance path direction contained in the article moving velocity is offset. That is, the velocity component in the article conveyance path direction does not change before and after the change of the article advancing path. Therefore, the spacing on the conveyance path between the article being sorted and the article which follows is maintained constant. As a result, the conveyance pitch between the article being sorted and the article which follows can be shortened and hence it is possible to improve the sorting work efficiency.

Further, in the case where a plurality of spherical sorting roller groups are adapted to be respectively turned independently by a plurality of swing mechanisms, each capable of being operated independently, and are arranged in series in the conveyance direction of the article conveyance path, it is possible to further shorten the conveyance pitch between the article to be sorted in the sorting position present halfway of the article conveyance path and the article which is to pass the sorting position. Accordingly, the sorting work efficiency can be further improved.

Additionally, since the clearances between the spherical sorting rollers are covered with a cover and the sorting rollers are projected upward from the cover only partially through circular roller projecting holes formed in the cover, the article being sorted can be prevented from being stuck between adjacent rollers which would cause damage to the article or to the rollers. Also, dust or a foreign matter falling from above the conveyance path can be prevented from getting into the interior of the sorting and discharging device.

What is claimed is:

1. A sorting and discharging device comprising:

an article conveyance path having a conveyance direction and a transverse direction;

a plurality of spherical sorting rollers arranged in both said conveyance direction and said transverse direction of said article conveyance path;

a plurality of roller supporting frames for supporting said spherical sorting rollers respectively so that the rollers can each rotate about a horizontal axis, said roller supporting frames each being rotatable at a predetermined position about a vertical axis passing through a center of an associated spherical sorting roller of said plurality of spherical rollers;

a swing mechanism for simultaneously turning each of said plurality of roller supporting frames about said vertical axis in such a manner that each of said plurality of spherical sorting rollers face a similar direction;

a plurality of cylindrical line shafts disposed respectively sideways to and in parallel with rows of said plurality of spherical sorting rollers arranged in said transverse direction of said article conveyance path, each of said plurality of line shafts coming into abutment respectively with spherical outer peripheral surfaces of each of said plurality of spherical rollers; and a drive source for rotating each of said plurality of line shafts simultaneously in a synchronized manner.

2. A sorting and discharging device according to claim 1, wherein a plurality of spherical sorting roller groups are arranged in series in said conveyance direction of said article conveyance path, each of said plurality of spherical sorting roller groups being respectively turned independently by a plurality of swing mechanisms each capable of being operated independently.

3. A sorting and discharging device according to any one of claims 1 and claim 2, wherein a plurality of clearances each formed between adjacent spherical sorting rollers of said plurality of spherical sorting rollers are covered with a cover having circular roller projecting holes, said roller projecting holes being formed in positions corresponding respectively to each of said plurality of spherical sorting rollers, and each spherical sorting rollers of said plurality of spherical sorting rollers project only partially from said roller projecting holes.

4. A sorting and discharging device according to claim 1, wherein a horizontal axis of said line shaft is disposed within said horizontal axis of said rollers.

* * * * *